United States Patent [19]
Schubert et al.

[11] 4,090,602
[45] May 23, 1978

[54] TIP TURNING APPARATUS FOR CIGARETTES OR THE LIKE

[75] Inventors: Bernhard Schubert, Neu Bornsen; Dietrich Bardenhagen, Hamburg, both of Germany

[73] Assignee: Hauni-Werke Korber & Co. KG, Hamburg, Germany

[21] Appl. No.: 804,451

[22] Filed: Jun. 7, 1977

[30] Foreign Application Priority Data

Jul. 20, 1976 Germany .............................. 2632557

[51] Int. Cl.² ............................................. B65G 47/24
[52] U.S. Cl. ................................... 198/377; 198/404; 198/951; 131/25
[58] Field of Search ............... 198/377, 402, 403, 404, 198/412, 951; 131/25

[56] References Cited

U.S. PATENT DOCUMENTS

| | | | |
|---|---|---|---|
| 3,215,250 | 11/1965 | Schubert | 198/951 |
| 3,319,764 | 5/1967 | Gamberini | 198/951 |
| 3,417,855 | 12/1968 | Liedtke | 198/951 |
| 3,485,337 | 12/1969 | Everhart | 198/951 |
| 3,583,546 | 6/1971 | Koop | 198/951 |
| 3,696,910 | 10/1972 | Schmermund et al. | 198/951 |
| 3,952,865 | 4/1976 | Rudszinat et al. | 198/377 |
| 3,973,671 | 8/1976 | Schwenke | 198/951 |

Primary Examiner—Bruce H. Stoner, Jr.
Assistant Examiner—Richard K. Thomson
Attorney, Agent, or Firm—Peter K. Kontler

[57] ABSTRACT

Successive filter cigarettes of two rows of parallel cigarettes are admitted into pairs of parallel aligned flutes on a rotating drum. The first flute of each pair is rotated through 180° and is moved radially outwardly about an axis which is normal to and crosses in space with the drum axis. The second flute of each pair is thereupon moved radially outwardly between the neighboring inverted flutes by a pivot member which is parallel to the drum axis whereby the cigarettes in the first and second flutes form a single row and can be transferred seriatim directly into successive flutes of a rotary testing drum.

10 Claims, 5 Drawing Figures

TIP TURNING APPARATUS FOR CIGARETTES OR THE LIKE

BACKGROUND OF THE INVENTION

The present invention relates to tip turning apparatus for cigarettes and analogous rod-shaped articles. More particularly, the invention relates to improvements in apparatus of the type wherein rod-shaped articles forming one of two rows of parallel articles are inverted end-for-end and placed between neighboring articles of the other row. The need for such manipulation of rod-shaped articles arises, for example, in machines for the making of filter cigarettes, cigars or cigarillos. As a rule, a filter tipping machine produces articles of double unit length, and each such article is thereupon severed midway between its ends to yield a pair of discrete articles of unit length whose filter tips are adjacent to each other. Prior to introduction of articles into the magazine of a packing machine, one article of each pair must be turned end-for-end so that the filter tips of all articles face in the same direction. Such tip turning or inversion is further necessary prior to transport of articles through one or more testing stations wherein the tobacco-containing ends of articles are monitored for firmness and the defective articles (i.e., those wherein the tobacco-containing ends are too firm or contain insufficient quantities of tobacco) are segregated from satisfactory articles.

Commonly owned German Pat. No. 1,178,756 discloses a tip turning apparatus wherein a rotary inverting conveyor carries two rows of flutes. The flutes of one row are turnable about axes which do not extend exactly radially of the conveyor and are laterally offset with respect to the axes of cigarettes in such flutes. The flutes of the other row are fixedly secured to the conveyor. The cigarettes to be tip turned are introduced into successive flutes of the one row and the respective flutes are thereupon rotated through 180° to invert the cigarettes therein and to place the inverted cigarettes between the cigarettes in the flutes of the other row. The axes about which the flutes of the one row are caused to turn are located in a common plane which is normal to the axis of the conveyor.

The cigarettes which leave the conveyor are deposited on an endless belt. This renders it possible to transport the cigarettes in the other row of flutes at a first distance from the axis of the conveyor and to transport the cigarettes in the one row of flutes at a greater second distance from the conveyor axis. Such arrangement of flutes is necessary in order to insure that the flutes of the other row (and the cigarettes therein) cannot interfere with tip turning of cigarettes in the flutes of the one row.

A drawback of the just described apparatus is that the cigarettes on the aforementioned endless belt are not exactly parallel to each other (because the inverted cigarettes normally move through a shorter distance during transfer from the conveyor onto the belt than the non-inverted cigarettes). Therefore, the patented apparatus must be provided with auxiliary equipment which reorients certain cigarettes on the belt. Moreover, the cigarettes on the belt are staggered, as considered in the axial direction of the cigarettes, so that they must be caused to move between two stationary cams which shift each next-following cigarette axially into accurate register with the preceding cigarette. Such manipulation necessitates additional space and the cams are likely to damage or deface the ends of cigarettes.

Another drawback of the patented apparatus is that it cannot transfer the row consisting of inverted and non-inverted cigarettes directly into the flutes of a rotary drum-shaped conveyor, for example, into the flutes of a drum which is used to transport filter cigarettes through the testing station of a filter tipping machine. The cigarettes at the testing station are examined for the integrity of their wrappers and/or the quality of the tobacco-containing ends. In the patented apparatus, the cigarettes must be transferred onto the aforementioned belt prior to transfer onto a drum-shaped rotary conveyor.

OBJECTS AND SUMMARY OF THE INVENTION

An object of the invention is to provide a tip turning apparatus for cigarettes or analogous rod-shaped articles which is simpler, more compact and more reliable than heretofore known apparatus.

Another object of the invention is to provide a tip turning apparatus wherein a single inverting conveyor suffices to change the orientation of one row of two rows of rod-shaped articles and to assemble the reoriented articles with the other articles into a single row wherein all articles are equally spaced from and accurately aligned with each other.

A further object of the invention is to provide a tip turning apparatus which can be installed in or combined with existing machines for the production of smokers' products or other machines wherein the orientation of a row of parallel articles must be changed through 180°.

An additional object of the invention is to provide a filter tipping machine which embodies the improved tip turning apparatus.

An ancillary object of the invention is to provide a novel and improved inverting conveyor for use in the above outlined apparatus.

Another object of the invention is to provide an apparatus which is constructed and assembled in such a way that the inverted and non-inverted articles can be transferred directly onto a rotary drum-shaped conveyor.

A further object of the invention is to provide an apparatus which insures exact parallelism of inverted and non-inverted articles and equal spacing of such articles, even if the apparatus must process several thousands of articles per minute.

The invention is embodied in an apparatus for inverting successive cigarettes or analogous rod-shaped articles in one of two adjacent rows of articles and for shuffling the inverted articles with the articles of the other row (i.e., for placing each inverted article between two neighboring non-inverted articles). The apparatus comprises a cylindrical or drum-shaped inverting conveyor which is rotatable about a first axis (e.g., about a horizontal axis), sets (preferably annuli) of first and second elongated flutes or analogous article receiving means which are preferably provided with article-attracting suction ports, means for articulately connecting the first flutes (which are parallel to the conveyor axis) to the conveyor including pivot members having second axes which are parallel to the conveyor axis and about which the corresponding first flutes are movable between a first arcuate path which is nearer to and a second arcuate path which is more distant from the conveyor axis, means for articulately connecting the second flutes to the conveyor including fulcra whose (third) axes cross in space with and are located in a plane normal to the conveyor axis (the second flutes are movable about the respective third axes through 180° between first positions in the first path and second positions in the second path and each second flute is aligned end-to-end with a first flute in the first path and is parallel with and located behind a first flute in the second path), means for moving successive second flutes from the first into the second path during a first stage of each revolution of the conveyor, means for moving successive first flutes from the first into the second path during a later second stage of each revolution of the conveyor, means for supplying pairs of coaxial articles into successive aligned first and second flutes at a first transfer station at which the aligned flutes are located during a third stage which precedes the first stage of each revolution of the conveyor, and means for accepting alternating inverted and non-inverted articles from alternating second and first flutes at a second transfer station at which the flutes (moving along the second path) are located during a fourth stage which follows the second stage of each revolution of the conveyor.

One end of each second flute is adjacent the aligned first flute during the third stage of each revolution of the conveyor. Each third axis is adjacent to and is laterally offset from the one end of the respective second flute.

The means for connecting the first flutes with the conveyor preferably further comprises levers or arms which extend substantially radially of the respective pivot members and support the corresponding first flutes.

The novel features which are considered as characteristic of the invention are set forth in particular in the appended claims. The improved apparatus ifself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
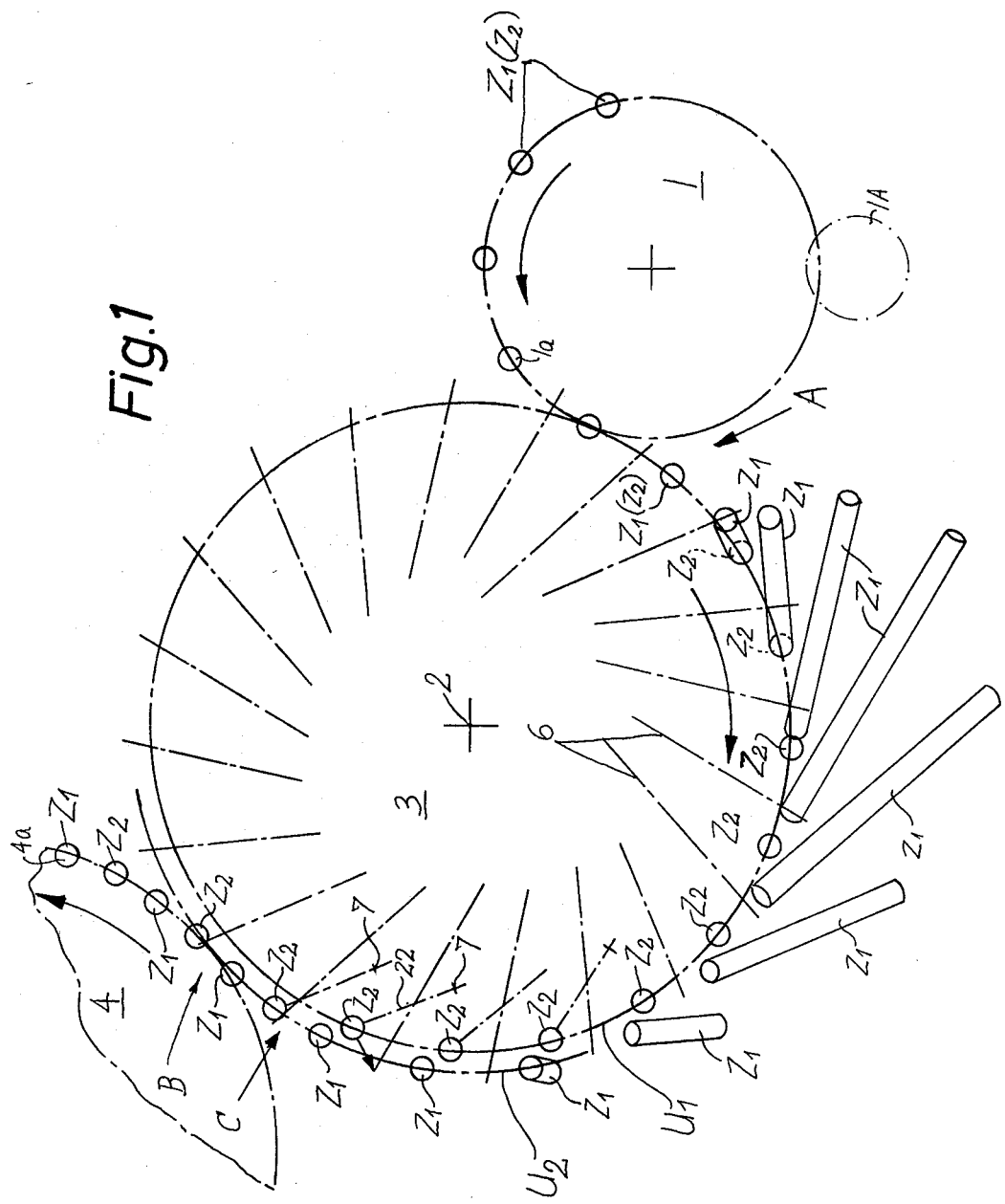
FIG. 1 is a schematic side elevational view of an apparatus which embodies the invention.

Referring first to FIG. 1, there is shown a rotary drum-shaped article supplying conveyor 1 which is driven to rotate in a counterclockwise direction and whose periphery is formed with parallel flutes 1a or analogous receiving means for pairs of coaxial filter cigarettes $Z_1$ and $Z_2$. The filter tips of the cigarettes $Z_1$, $Z_2$ in each flute 1a are adjacent to each other. The conveyor 1 may constitute the severing conveyor of a filter cigarette making machine, i.e., this conveyor can receive filter cigarettes of double unit length and transport such cigarettes past a rotary disk-shaped knife 1A which severs each cigarette midway between its ends so that the cigarette yields two coaxial filter cigarettes $Z_1$, $Z_2$ of unit length.

The flutes 1a deliver the respective pairs of aligned cigarettes $Z_1$, $Z_2$ to a transfer station A where the pairs of cigarettes are transferred into the receiving means or flutes of an inverting conveyor 3 here shown as a rotary drum-shaped conveyor rotating in a clockwise direction about a fixed horizontal axis 2. The cigarette $Z_1$ of each pair of cigarettes $Z_1$, $Z_2$ is tip turned (through 180°) during travel with the inverting conveyor 3, and each tip turned cigarette $Z_1$ is shuffled with (i.e., placed into the space between) two neighboring (non-inverted) cigarettes $Z_2$ so that the cigarettes $Z_1$ and $Z_2$ leaving the inverting conveyor 3 at a second transfer station B form a single row wherein all filter tips face in the same direction. The cigarettes $Z_1$ and $Z_2$ of the thus obtained single row are transferred into successive flutes 4a of an article accepting conveyor 4 here shown as a rotary drum-shaped member which is driven to rotate in a counterclockwise direction. The conveyor 4 may form part of or may serve to transport the cigarettes $Z_1$ and $Z_2$ past a testing unit, e.g., a unit which monitors the tobacco-containing ends of successive cigarettes and produces signals in response to detection of cigarettes with defective ends; such signals are used for segregation of corresponding cigarettes from satisfactory cigarettes.

During that stage of each revolution of the conveyor 3 which immediately follows the transfer of a pair of coaxial cigarettes $Z_1$, $Z_2$ from the respective flute 1a of the conveyor 1, the cigarettes of each pair move sideways, i.e., without any change in orientation of the cigarette $Z_1$ with respect to the adjacent cigarette $Z_2$. The arcuate path along which the cigarettes $Z_1$, $Z_2$ move immediately following the transfer onto the conveyor 3 is shown at $U_1$. During the next stage of each revolution of the conveyor 3, the cigarette $Z_1$ of each pair is turned through 180° about an axis 6 (indicated by phantom lines). Furthermore, each inverted cigarette $Z_1$ is simultaneously transferred into a second arcuate path $U_2$ whose center of curvature is located on the axis 2 (the same as the center of curvature of the path $U_1$); however, the radius of curvature of the path $U_2$ is larger than that of the path $U_1$. The cigarettes $Z_2$ continue to advance along the path $U_1$ during the initial interval of movement of inverted cigarettes $Z_1$ along the path $U_2$.

Figure 4:
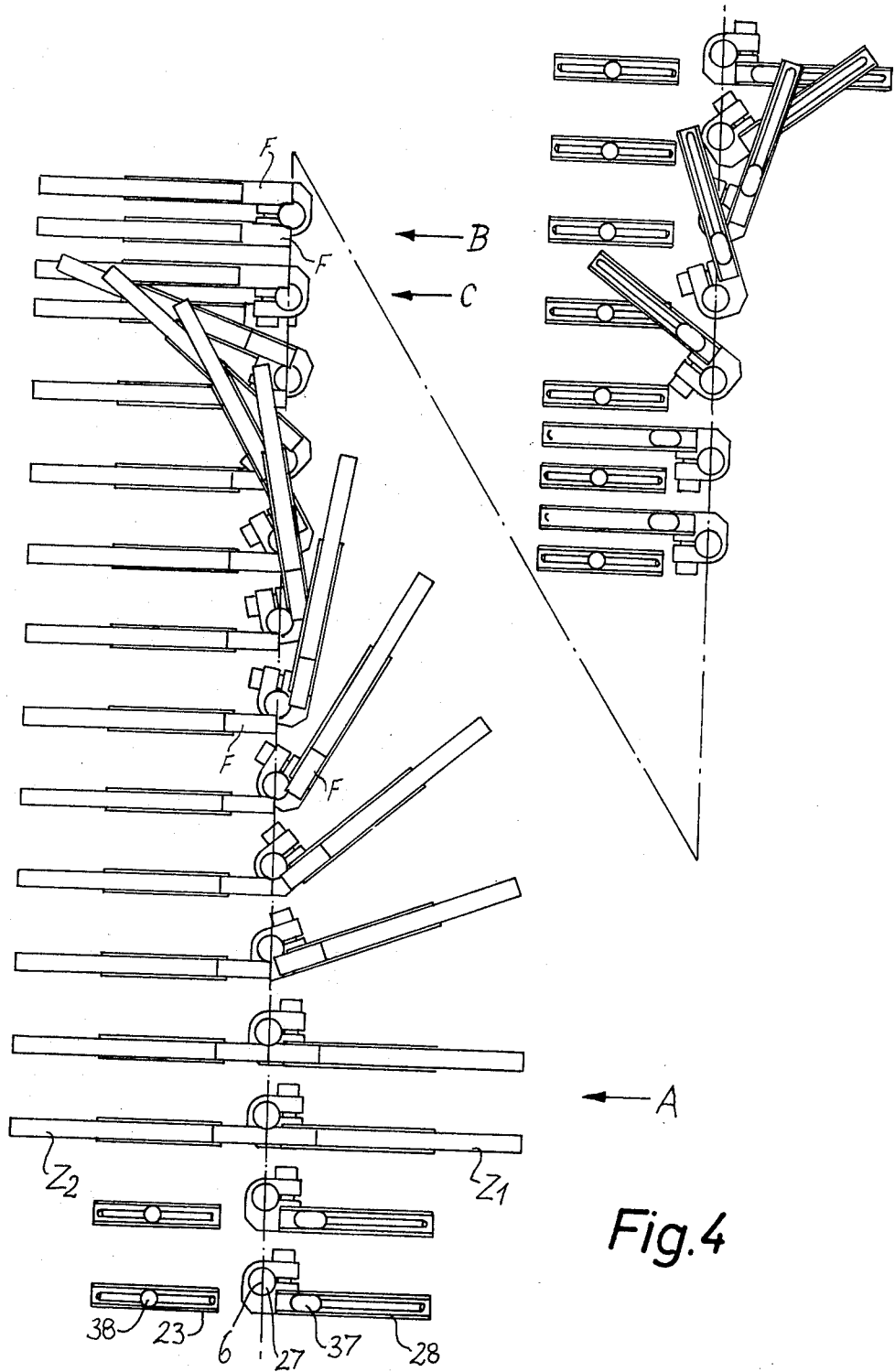
FIG. 4 is a developed view of the parts at the periphery of the inverting conveyor and shows the manner in which the articles of one row are inverted and thereupon shuffled with the articles of the other row.

The axes 6 are located in a common plane which is normal to the axis 2 of the conveyor 3; however, the axes 6 do not intersect each other in the axis 2 but are tangential to a circle having a radius which is smaller than the radius of the drum-shaped conveyor 3. It can be said that each axis 6 crosses in space with the axis 2. As shown in FIG. 4, the cigarettes $Z_1$ are already tip turned through 180° while moving along the path $U_2$ (radially outwardly of the path $U_1$ for the cigarettes $Z_2$) and the cigarettes $Z_2$ are thereupon moved into the path $U_2$ (by causing them to move about discrete axes 7 which are parallel to the axis 2 of the conveyor 3). This results in introduction of cigarettes $Z_2$ into the path $U_2$ wherein the cigarettes $Z_2$ alternate (i.e., are shuffled) with the cigarettes $Z_1$ not later than upon arrival at the second transfer station B. The distances between neighboring cigarettes $Z_1$ and $Z_2$ in the path $U_2$ are identical.

The region C where successive cigarettes $Z_2$ are moved from the path $U_1$ into the path $U_2$ is located upstream of the transfer station B. It will be seen that each revolution of the inverting conveyor 3 about the axis 2 includes a first stage during which a cigarette $Z_1$ is tip turned and simultaneously moved from the path $U_1$ into the path $U_2$, a later second stage during which a non-inverted cigarette $Z_2$ is moved from the path $U_1$ into the path $U_2$ and is simultaneously shuffled with the neighboring inverted cigarettes $Z_1$, a third stage which precedes the first stage and during which two aligned cigarettes $Z_1$ and $Z_2$ move (in the path $U_1$) from the transfer station A, and a fourth stage which follows the second stage and during which alternating cigarettes $Z_1$ and $Z_2$ (in the path $U_2$) move toward the transfer station B.

Figure 2:
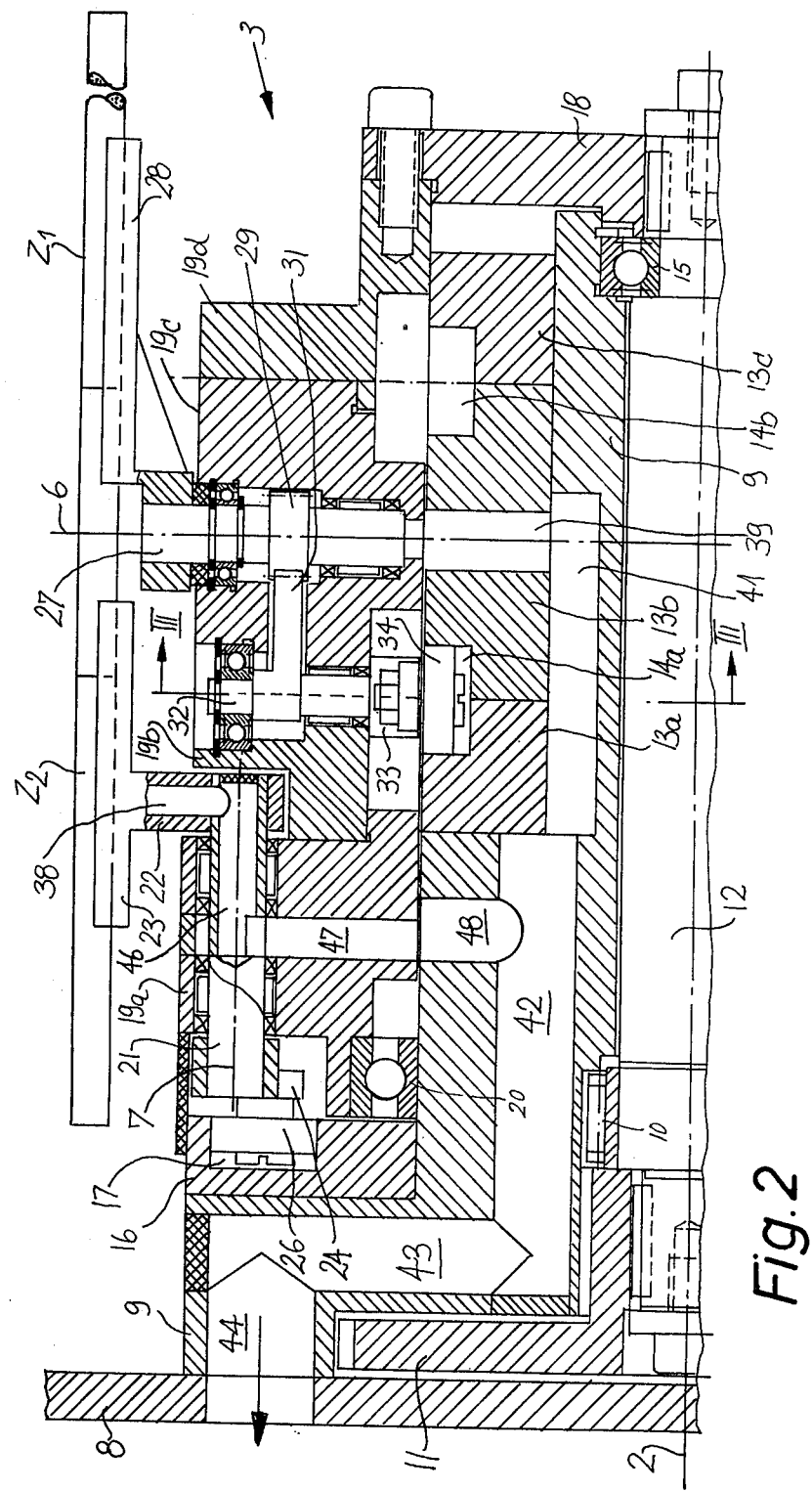
FIG. 2 is a fragmentary axial sectional view of the inverting conveyor in the apparatus of FIG. 1, two aligned flutes being shown in positions they assume during the third stage of each revolution of the inverting conveyor.
Figure 3:
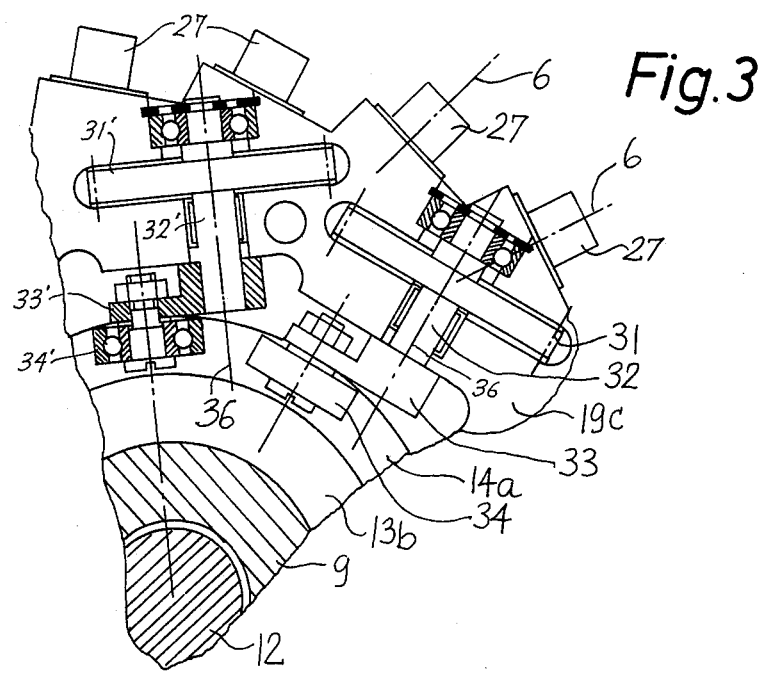
FIG. 3 is a transverse sectional view as seen in the direction of arrows from the line III—III of FIG. 2.

The construction of the inverting conveyor 3 is shown in FIGS. 2 and 3. A frame member or wall 8 of the filter tipping machine carries a sleeve 9 surrounding a shaft 12 which is driven by the prime mover of the filter tipping machine through the medium of a transmission including a gear 11. The smaller-diameter portion of the sleeve 9 is surrounded by a ring-shaped cam consisting (for convenience of assembly) of three coaxial annular sections 13a, 13b, 13c. The periphery of the cam 13a–13c is formed with two cam grooves 14a and 14b. These grooves are located at the opposite sides of the common plane of the axes 6.

A further annular cam 16 surrounds the smaller-diameter portion of the sleeve 9 between the cam 13a–13c and the frame member 8; the exposed end face of the cam 16 has an annular cam groove 17. That end portion of the shaft 12 which is remote from the frame member 8 and gear 11 is connected with a coupling disk 18 which is secured to the rightmost annular section 19d of a composite hollow conveyor body or cylinder further including the sections 19a, 19b and 19c. The cylinder 19a–19d is put together of four discrete sections for convenience of assembly of the conveyor 3. The coupling disk 18 can be said to constitute a fifth section of the cylinder. The sleeve 9 is stationary and the cylinder 19a–19d receives torque from the shaft 12 via coupling disk 18. The section 19a surrounds an antifriction bearing 20 which, in turn, surrounds the sleeve 9. The shaft 12 rotates in a needle bearing 10 and a ball bearing 15.

The section 19a of the cylinder contains an annulus of pivot members 21 whose axes (7) coincide with the axes about which successive filter cigarettes $Z_2$ are moved from the path $U_1$ into the path $U_2$ during travel in the region C immediately ahead of the transfer station B. One end portion of each pivot member 21 is rigid with a radially extending lever or arm 22 supporting an elongated flute 23. Each flute 23 can support and attract a cigarette $Z_2$. The other end portion of each pivot member 21 is connected with a discrete lever or arm 24 for a roller follower 26 which extends into the groove 17 of the cam 16.

The section 19c of the cylinder contains an annulus of equally spaced fulcra 27 whose axes coincide with the aforementioned axes 6. Those end portions of the fulcra 27 which extend radially outwardly beyond the section 19c carry elongated flutes 28 for the cigarettes $Z_1$. The fulcra 27 are rigid with gears 29. Each second gear 29 meshes with a gear segment 31 on a shaft 32 mounted between the sections 19b, 19c. The remaining gears 29 mesh with discrete gear segments 31' on shafts 32' mounted between the sections 19c, 19d. The gear segments 31' are angularly offset with respect to the gear segments 31, as considered in the circumferential direction of the cam 13a–13c. The gears 31 and the corresponding segments 31 or 31' form part of the means for moving the respective flutes 28 about the corresponding axes 6. The shafts 32 carry levers or arms 33 for roller followers 34 which extend into the cam groove 14a, and the shafts 32' carry levers or arms 33' for roller followers 34' which extend into the cam groove 14b. The transmission ratio between the segments 31 or 31' and the associated gears 29 is 2.5 to 1. The shafts 32 and 32' are installed in the cylinder sections 19b–19d in such a way that their axes 36 extend tangentially to the shaft 12 (see FIG. 3). The gears 29 are spur gears whose teeth are parallel to the respective axes 6, and the teeth of segments 31, 31' make angles of 32° with the respective axes 6. FIGS. 2 and 4 show that the common plane of the axes 6 coincides with the plane of the cutting edge of the knife 1A, i.e., with the plane in which coaxial cigarettes $Z_1$ and $Z_2$ abut or nearly abut each other at the transfer station A. FIG. 4 shows that the flutes 28 for the cigarettes $Z_1$ are laterally offset from the axes 6 of the respective fulcra 27 and that each axis 6 is adjacent to one end of the respective flute 28, namely, to that end which is adjacent the neighboring flute 23 at the transfer station A.

The means for preventing the cigarettes $Z_1$ and $Z_2$ from leaving the respective flutes 28 and 23 during travel between the transfer stations A and B comprises a suction generating device (e.g., a suitable fan, not shown) which draws air into suction ports 37, 38 machined into the flutes 28, 33. The ports 37 extend into the respective fulcra 27 and communicate (in predetermined angular positions of the respective fulcra 27) with a suction chamber 41 between the sleeve 9 and cam 13a–13c by way of an arcuate groove 39 in the section 13b. The suction chamber 41 communicates with the intake of the suction generating device by way of a second suction chamber 42 and passages 43, 44 in the sleeve 9. Each port 38 communicates with the suction chamber 42 (in predetermined angular positions of the respective portion of the cylinder section 19a) by way of an arcuate groove 48 in the sleeve 9, a substantially radial channel 47 of the cylinder section 19a and an axial channel or bore 46 of the respective pivot member 21.

Figure 5:
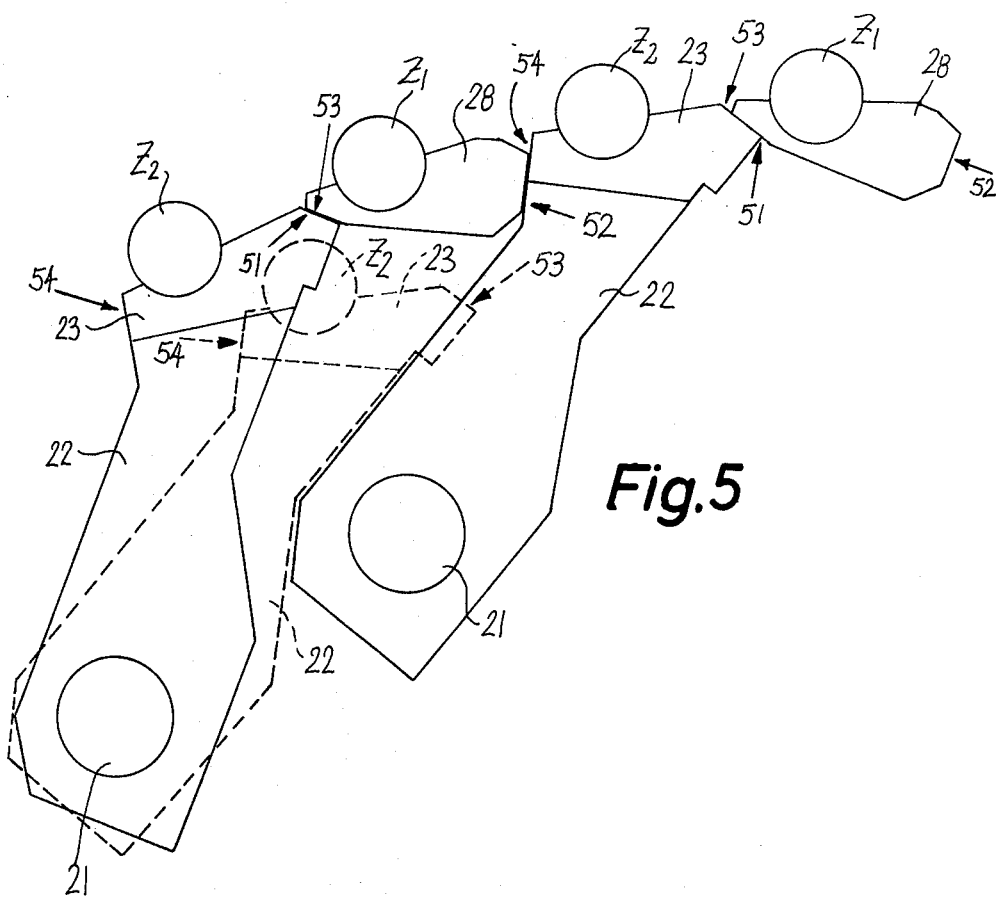
FIG. 5 is an enlarged side elevational view of four neighboring flutes in positions they assume at the second transfer station.

FIG. 5 shows that the flutes 28 have facets or flats 51, 52 and the flutes 23 have facets or flats 53, 54.

The pivot members 21, fulcra 27 and shafts 32, 32' are mounted in suitable antifriction bearings which are shown but not specifically referenced in the drawing. Also, each roller follower preferably comprises an antifriction bearing the outer race of which tracks the surface surrounding the respective cam groove (see FIG. 3).

The parts 16–17, 21–24, 26 can be said to constitute means for moving successive flutes 23 from the path $U_1$ into the path $U_2$ during the aforementioned second stage of each revolution of the conveyor 3. The parts 13a–c, 14a–b, 27, 29, 31–34 and 31'–34' constitute means for moving successive flutes 28 from first positions (in the path $U_1$) to second positions (in the path $U_2$) during the aforementioned first stage of each revolution of the conveyor 3. The parts 29, 31–33 and 29, 31'–33' serve to transmit motion from the roller followers 34 and 34' to the respective fulcra 27.

The operation will be described with reference to FIGS. 1 and 4. The shaft 12 receives torque from the prime mover of the filter tipping machine via gear 11 and drives the cylinder 19a–19d through the medium of the coupling disk 18. The roller followers 34, 34' travel in the respective cam grooves 14a, 14b and change the angular positions of gear segments 31, 31' by way of the corresponding arms 33, 33' and shafts 32, 32'. The segments 31, 31' rotate the respective gears 31 which turn the fulcra 27 and the associated flutes 28 through 180° about the respective axes 6. The configuration of surfaces bounding the groove 17 of the cam 16 is such that the orientation of the flutes 23 and cigarettes $Z_2$ remains unchanged while the flutes 28 turn the cigarettes $Z_1$ therein through 180°. Each cigarette $Z_1$ is parallel to the adjacent cigarettes $Z_2$ when the respective flute 28 completes an angular movement through 180°. Moreover, such angular movement of flutes 28 (about axes 6 which do not intersect the axis 2 of the conveyor 3) results in transfer of inverted cigarettes $Z_1$ from the path $U_1$ into the path $U_2$.

The cylinder 19a–19d continues to rotate about the sleeve 9 whereby the cam 16 causes the roller followers 26 to turn successive pivot members 21 about the axes 7 to thereby transfer the cigarettes $Z_2$ from the path $U_1$ into the path $U_2$ (in the zone C preceding the transfer station B) so that the cigarettes $Z_1$ and $Z_2$ in the path $U_2$ form a single row of equally spaced alternating cigarettes $Z_1$ and $Z_2$ and the filter tips F (see FIG. 4) of all cigarettes face in the same direction. The facets or flats 51, 52 of the flutes 28 respectively abut against the facets or flats 53, 54 of the neighboring flutes 23 when the inverted cigarettes $Z_1$ and the non-inverted cigarettes $Z_2$ are located in and advance along the path $U_2$. This insures that the cigarettes $Z_1$ and $Z_2$ approaching the transfer station B are invariably parallel to each other and can be readily transferred into successive flutes 4a of the accepting conveyor 4. The provision of facets or flats 51–54 is optional but desirable, especially if the tip turning of cigarettes $Z_1$ is to take place at a high frequency so that the flutes 28 are likely to turn through more than 180° owing to inertia of parts which receive motion from the gear segments 31 and 31'. Furthermore, the provision of flats 51–54 or analogous portions of flutes 28 and 23 renders it possible to insure accurate parallelism of inverted and non-inverted cigarettes even if the parts of the apparatus are not machined with a maximum degree of accuracy.

The placing of axes 6 into the plane in which the filter tips F of cigarettes $Z_1$ abut against the filter tips F of the cigarettes $Z_2$ in the flutes 1a and also in the flutes 28, 23 immediately downstream of the transfer station A insures that the inverted cigarettes $Z_1$ are accurately aligned with adjacent cigarettes $Z_2$ during travel along the path $U_2$ and in the flutes 4a of the accepting conveyor 4. This renders it possible to dispense with a discrete conveyor with cams which serve to shift certain cigarettes axially in certain conventional tip turning apparatus in order to insure that the end faces of all (inverted and non-inverted) cigarettes are located in two parallel planes normal to the axes of the cigarettes. As mentioned before, such cams contribute to the bulk of the apparatus and are likely to deface and/or otherwise damage the cigarettes, especially in a high-speed filter tipping machine, e.g., a machine which is directly coupled with a cigarette maker serving to turn out up to and in excess of 70 plain cigarettes per second.

The distribution of roller followers 34 and 34' into two groups (one at each side of the common plane of the axes 6) is desirable and advantageous in certain recent types of filter tipping machines wherein the cigarettes forming a single row of inverted and non-inverted cigarettes should be located very close to each other.

As a rule, the distance between neighboring flutes 28 should be within the range of 34–38 mm. This can be readily achieved by employing two groups of roller followers 34, 34' whereby the followers 34 alternate with the followers 34', as considered in the circumferential direction of the inverting conveyor 3.

Successive flutes 23 which advance beyond the station B are returned into the path $U_1$ (by the cam 16) during travel toward the transfer station A. Empty flutes 28 are thereupon returned into the path $U_1$ and into positions of exact end-to-end alignment with neighboring flutes 23 before such flutes reach the station A. This is shown in the upper right-hand portion of FIG. 4. The aligned flutes 28 and 23 are then ready to receive fresh pairs of coaxial cigarettez $Z_1$ and $Z_2$.

An advantage of the improved apparatus is that a single inverting conveyor (3) suffices to effect the turning of one row of cigarettes ($Z_1$) end-for-end and to insure that the tip-turned cigarettes are placed between the neighboring (non-inverted) cigarettes $Z_2$. Moreover, the cigarettes of the thus obtained single row are equally spaced from and exactly parallel to each other, even if the apparatus is to process a large number of rod-shaped articles per unit of time. The articles are treated gently and are not subjected to any abrupt changes in speed and/or direction of movement so that they are unlikely to be deformed and/or to lose tobacco particles. The conveyors 1, 3 and 4 can be driven continuously (which is preferred to stepwise movement) and the overall dimensions of the apparatus are a small fraction of the dimensions of many presently employed tip turning apparatus. The improved apparatus comprises a surprisingly small number of relatively simple, compact and rugged parts, and each such part can be reached with little loss in time.

Without further anaylsis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. Apparatus for inverting successive filter cigarettes or analogous rod-shaped articles in one of two adjacent rows of articles and for shuffling the inverted articles with the articles of the other row, comprising an inverting conveyor rotatable about a first axis; sets of first and second article receiving means, said first receiving means being parallel to said axis; means for articulately connecting said first receiving means to said conveyor, including pivot members having second axes which are parallel to said first axis and about which said first receiving means are movable between first and second arcuate paths respectively nearer to and more distant from said first axis; means for articulately connecting said second receiving means to said conveyor, including fulcra having third axes crossing in space with and located in a plane normal to said first axis, said second receiving means being movable about the respective third axes through 180° between first positions in said first path and second positions in said second path, each of said second receiving means being in end-to-end alignment with a first receiving means in said first path and being parallel with and located behind a first receiving means in said second path; means for moving successive second receiving means from first to second position during a first stage of each revolution of said conveyor; means for moving successive first receiving means from said first into said second path during a later second stage of each revolution; means for supplying pairs of coaxial articles into successive aligned first and second receiving means at a first station at which such receiving means are located during a third stage preceding said first stage of each revolution; and means for accepting articles from alternating first and second receiving means at a second station at which such receiving means are located during a fourth stage following said second stage of each revolution of said conveyor.

2. Apparatus as defined in claim 1, wherein each of said second receiving means is elongated and one end thereof is adjacent to the aligned first receiving means during said third stage of each revolution of said conveyor, each of said third axes being adjacent to and laterally offset from said one end of the respective second receiving means.

3. Apparatus as defined in claim 1, wherein said first mentioned connecting means further comprises levers extending substantially radially from the respective pivot members and supporting the respective first receiving means.

4. Apparatus as defined in claim 1, wherein said first mentioned moving means comprises stationary cam means and followers connected with said pivot members and tracking said cam means.

5. Apparatus as defined in claim 1, wherein said supplying means includes a second conveyor having means for transporting pairs of coaxial articles sideways so that the articles of each pair abut against each other in said plane.

6. Apparatus as defined in claim 1, wherein said last mentioned moving means includes stationary cam means, a follower for each of said second receiving means, said followers being rotatable with said conveyor and tracking said cam means, and means for transmitting motion from said followers to the respective fulcra.

7. Apparatus as defined in claim 6, wherein each of said motion transmitting means comprises a first gear coaxial with the respective fulcrum and a second gear rotatably mounted in said conveyor, meshing with said first gear and receiving torque from the respective follower.

8. Apparatus as defined in claim 7, wherein said cam means includes first and second cams located at the opposite sides of said plane and said followers include first and second groups respectively tracking said first and second cams.

9. Apparatus as defined in claim 8, wherein the followers of said first group alternate with the followers of said second group, as considered in the circumferential direction of said conveyor.

10. Apparatus as defined in claim 1, wherein said first receiving means have portions which abut against portions of neighboring second receiving means in said second path during said fourth stage of each revolution of said conveyor to thereby maintain the inverted articles in said second receiving means in exact parallelism with non-inverted articles in said first receiving means.

* * * * *